US008645450B1

(12) United States Patent  (10) Patent No.: US 8,645,450 B1
Choe et al.  (45) Date of Patent: Feb. 4, 2014

(54) MULTIPLIER-ACCUMULATOR CIRCUITRY AND METHODS

(75) Inventors: Kok Heng Choe, Penang (MY); Tony K Ngai, San Jose, CA (US); Henry Y. Lui, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1730 days.

(21) Appl. No.: 11/713,434

(22) Filed: Mar. 2, 2007

(51) Int. Cl.
    *G06F 7/38* (2006.01)

(52) U.S. Cl.
    USPC .......................................... 708/523; 708/603

(58) Field of Classification Search
    USPC .................................................. 708/523, 603
    See application file for complete search history.

(56) References Cited

U.S. PATENT DOCUMENTS

| | | | |
|---|---|---|---|
| 3,473,160 A | 10/1969 | Wahlstrom | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A * | 10/1986 | Betz ............................... | 708/603 |
| 4,623,961 A | 11/1986 | Mackiewicz | |
| 4,682,302 A | 7/1987 | Williams | |
| 4,718,057 A | 1/1988 | Venkitakrishnan et al. | |
| 4,727,508 A | 2/1988 | Williams | |
| 4,736,335 A * | 4/1988 | Barkan ........................ | 708/626 |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Statix II Device Handbook, Chapter 6—DSP Blocks in Stratix II Devices," v1.1, Jul. 2004.
Altera Corporation, "Digital Signal Processing (DSP)," *Stratix Device Handbook*, vol. 2, Chapter 6 and Chapter 7, v1.1 (Sep. 2004).
Altera Corporation, "DSP Blocks in Stratix II and Stratix II GX Devices" *Stratix II Device Handbook*, vol. 2, Chapter 6, v4.0 (Oct. 2005).
Altera Corporation, "FIR Compiler: MegaCore® Function User Guide," version 3.3.0, rev. 1, pp. 3 11 through 3 15 (Oct. 2005).

(Continued)

*Primary Examiner* — Chuong D Ngo
(74) *Attorney, Agent, or Firm* — Ropes & Gray LLP; Jeffrey H. Ingerman

(57) ABSTRACT

Multiplier-accumulator circuitry includes circuitry for forming a plurality of partial products of multiplier and multiplicand inputs, carry-save adder circuitry for adding together the partial products and another input to produce intermediate sum and carry outputs, final adder circuitry for adding together the intermediate sum and carry outputs to produce a final output, and feedback circuitry for applying the final output (typically after some delay, e.g., due to registration of the final output) to the carry-save adder circuitry as said another input. The above circuitry may be implemented in so-called "hard IP" (intellectual property) of a field-programmable gate array ("FPGA") integrated circuit device. If desired, any overflow from the accumulation performed by the above circuitry may be accumulated in "soft" accumulator-overflow circuitry that is implemented in the general-purpose programmable logic of the FPGA.

16 Claims, 4 Drawing Sheets

(56) References Cited

U.S. PATENT DOCUMENTS

| | | |
|---|---|---|
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A * | 12/1994 | Uramoto et al. .............. 708/709 |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A * | 12/1998 | Kelley et al. .................. 708/603 |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | De Lange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |

(56) References Cited

U.S. PATENT DOCUMENTS

| | | |
|---|---|---|
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 * | 2/2003 | Savo et al. .................... 708/706 |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,930,335 B2 | 4/2011 | Gura |
| 7,930,336 B2 | 4/2011 | Langhammer |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2007/0083585 A1 | 4/2007 | St Denis et al. |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0172052 A1 | 7/2009 | DeLaquil et al. |

(56) References Cited

U.S. PATENT DOCUMENTS

| | | | |
|---|---|---|---|
| 2009/0187615 | A1 | 7/2009 | Abe et al. |
| 2009/0300088 | A1 | 12/2009 | Michaels et al. |
| 2010/0098189 | A1 | 4/2010 | Oketani |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-219279 | 8/1999 |
| JP | 11-296345 | 10/1999 |
| JP | 2000-259394 | 9/2000 |
| JP | 2000-353077 | 12/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO97/08610 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 456-461.

Aoki, T., "Signed-weight arithmetic and its application to a field-programmable digital filter architecture," *IEICE Transactions on Electronics*, 1999 , vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx " *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000, Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in Flex 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA " *1996 2nd International Conference on ASIC Proceedings (IEEE* Cat. No. 96TH8140), Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic " *Elettronica Oggi*, No. 266 , Dec. 1998, pp. 113-115.

Langhammer, M., "Implementing a DSP in Programmable Logic " *Online EE Times*, May 1998, http:--www.eetimes.com-editorial-1998-coverstory9805.html.

(56) References Cited

OTHER PUBLICATIONS

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+FDSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control" *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature Number: SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1.

"Virtex-II 1.5V Field-Programmable Gate Arrays", *Xilinx*, Apr. 2, 2001, module 2.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication " *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., " XtremeDSP Design Considerations User Guide," v 1.2, Feb. 4, 2005.

Xilinx Inc., "Complex Multiplier v2.0", DS291 Product Specification/Datasheet, Nov. 2004.

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report* CPSY2005-47, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report* CPSY2005-63, vol. 105, No. 516, Jan. 18, 2006.

Vladimirova, T. et al., "Floating-Point Mathematical Co-Processor for a Single-Chip On-Board Computer," *MAPLD'03 Conference*, D5, Sep. 2003.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Nedjah, N., et al., "Fast Less Recursive Hardware for Large Number Multiplication Using Karatsuba-Ofman's Algorithm," *Computer and Information Sciences—ISCIS*, pp. 43-50, 2003.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

\* cited by examiner

MULTIPLIER-ACCUMULATOR CIRCUITRY AND METHODS

BACKGROUND OF THE INVENTION

This invention relates to multiplier-accumulator ("MAC") circuitry and methods. A possible application of the invention is to implement MAC operations on field-programmable gate array ("FPGA") integrated circuit devices.

Multiplier-accumulator ("MAC") operations are frequently needed in such applications as digital signal processing ("DSP"). DSP is becoming increasingly important, and more and more widely used. In addition, DSP operations are becoming larger and more complex. Field-programmable gate array ("FPGA") integrated circuit devices are potentially usable in many applications requiring DSP. However, DSP can consume excessive amounts of FPGA resources unless care is taken in the design of the FPGA to avoid that. Because MAC operations are at the heart of many (if not most) DSP operations, it is important to find ways for FPGAs to perform MAC operations extremely efficiently (e.g., without requiring excessive delay (latency) and without using excessive amounts of either operating or routing circuitry on the FPGA).

SUMMARY OF THE INVENTION

Multiplier-accumulator circuitry in accordance with the invention may include circuitry for forming a plurality of partial products of multiplier and multiplicand inputs, carry-save adder circuitry for adding together the partial products and another input to produce intermediate sum and carry outputs, final adder circuitry adding together the intermediate sum and carry outputs to produce a final output, and feedback circuitry for applying the final output to the carry-save adder circuitry as said another input. The feedback circuitry may be selectively operable so that the overall circuitry can alternatively operate only as a multiplier. The feedback circuitry typically operates with some delay, e.g., as a result of registration of the final output prior to feeding that output back. The circuitry summarized above may be implemented in special-purpose circuitry of a field-programmable logic array ("FPGA") integrated circuit. The maximum word-length of this special-purpose circuitry may be approximately equal to the maximum length of a product of the multiplier and multiplicand inputs. General-purpose programmable logic elements of the FPGA may be used to provide accumulator-overflow circuitry for accumulating overflow from the final adder circuitry during multiplier-accumulator operations in applications in which such overflow accumulation is desired.

Further features of the invention, its nature and various advantages, will be more apparent from the accompanying drawings and the following detailed description.

DETAILED DESCRIPTION

Figure 1:
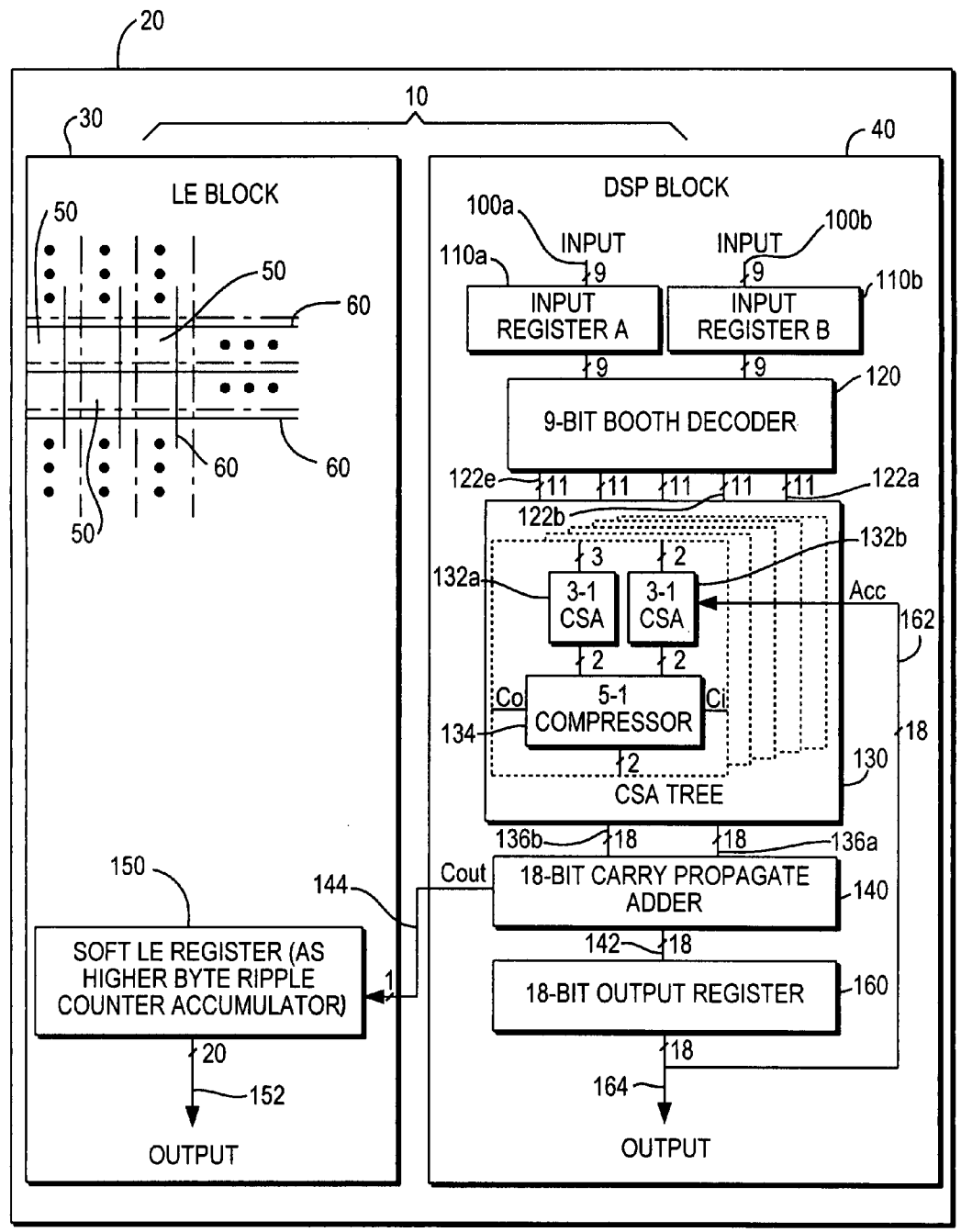
FIG. 1 is a simplified block diagram of an illustrative embodiment of the invention.

An illustrative embodiment of multiplier-accumulator ("MAC") circuitry 10 in accordance with the invention is shown in FIG. 1. Circuitry 10 is implemented on a field-programmable gate array ("FPGA") integrated circuit 20. FPGA 20 includes a logic element ("LE") block 30 and a digital signal processing ("DSP") block 40. FPGA 20 may also include various other types of circuitry such as input/output ("IO") blocks and random access memory ("RAM") blocks. However, only LE block 30 and DSP block 40 are immediately relevant to the present invention, and so only these blocks are shown in FIG. 1.

LE block 30 is (or is part of) what may be referred to as the general-purpose logic circuitry of FPGA 20. LE block 30 typically includes many instances of logic element ("LE") circuitry 50. Each LE 50 is typically programmable to perform any one (or more) of a large number of possible logic functions on signals applied to that LE. The result(s) of the logic function(s) performed by each LE 50 is(are) the output signal(s) of that LE. LE block 30 also typically includes interconnection conductor resources 60 for conveying signals to, from, and/or between LEs 50. Interconnection conductor resources 60 are typically programmable to at least some extent with respect to the connections/interconnections that they make.

DSP block 40 is (or is part of) what may be referred to as the special-purpose circuitry of FPGA 20. Although circuitry 40 may be programmable in some respects, the functions of its various components or subblocks are predetermined to at least a substantial degree. Although only a single MAC 10 is shown in FIG. 1, it will be understood that DSP block 40 may include the circuitry for multiple such MACs, and that DSP block 40 may also include other types of special-purpose circuitry. Such special-purpose circuitry on an FPGA may sometimes be referred to as "hard IP" (intellectual property) to differentiate it from the "soft IP" that is programmable into the general-purpose circuitry (like LE block 30) of the FPGA.

In the illustrative embodiment of MAC 10 that is shown in FIG. 1, a major portion of the MAC is implemented in DSP block 40. Only a relatively small part of MAC 10 is implemented in LE block 30. We will first consider in detail the portion of MAC 10 that is implemented in DSP block 40.

MAC 10 has two 9-bit inputs 100a and 100b in DSP block 40. These two inputs are two numbers that are to be multiplied together by the MAC. One of these numbers may be referred to as the multiplier, and the other may be referred to as the multiplicand. It does not matter which of the two numbers is the multiplier and which is the multiplicand.

Each of inputs 100 may be registered in a respective one of input registers A and B (also identified by reference numbers 110a and 110b). The outputs of registers 110 are applied to 9-bit Booth decoder circuitry 120.

Figure 2:
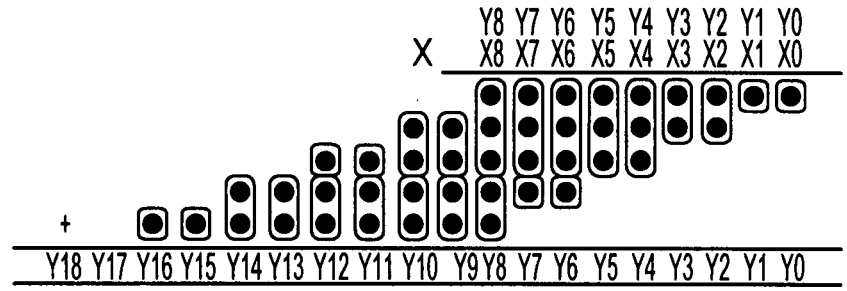
FIG. 2 is a simplified diagram illustrating some intermediate computations that can be performed in multiplier circuitry.

Booth decoder circuitry 120, which can be conventional, forms a plurality of partial products 122a-122e that are intermediate results in the process of multiplying together the outputs of registers 110a and 110b. Each of the horizontal rows of round, solid dots in FIG. 2 represents the information for one of these partial products. The information for each of these partial products is applied to carry-save adder ("CSA") tree circuitry 130 via a respective one of 11-conductor buses 122a-e.

In addition to having the five partial product inputs 122a-e, CSA tree 130 has another 18-conductor input 162. The signals on bus 162 are the output of the MAC (or at least the less significant portion of the MAC output that needs direct addition to the partial products to produce the next MAC output value). The solid squares in FIG. 3 show how the data on bus 162 is used to supplement the partial product data in CSA tree 130.

Figure 3:
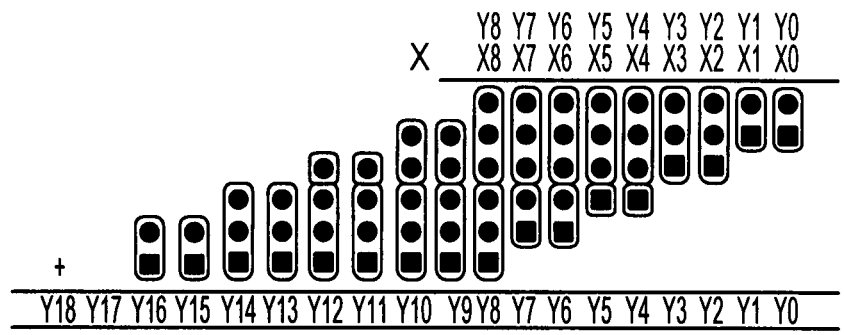
FIG. 3 is a simplified diagram illustrating modification of FIG. 2 in accordance with the invention.

FIG. 1 shows that for each column in FIG. 3, CSA tree 130 includes two carry-save adders 132a and 132b. In FIG. 3, the boxes around the round and/or square dots show what data is added by the carry-save adders 132a and 132b for each column. In general, the carry-save adder 132a for a column adds the data in the upper three rows of that column in FIG. 3, and the carry-save adder 132b for that column adds the data in the lower three rows of that column in FIG. 3. (Not all columns contain data in all three rows, so the preceding is only generally descriptive. It will be understood that some of carry-save adders 132 may be less than fully utilized and/or can be omitted.)

Still within CSA tree 132, the outputs of the two carry-save adders 132 for each column are combined by the five-to-one compressor circuitry 134 associated with that column. There are carry-in and carry-out connections between the compressors 134 associated with the various columns. The sum and carry outputs 136a and 136b of all of compressors 134 are applied to 18-bit carry-propagate adder ("CPA") 140. The final sum output 142 of adder 140 is applied to 18-bit output register 160. The output bus of register 160 is the less significant part of the final output of the MAC. The output bus of register 160 is also the source of the signals that are fed back to CSA tree 130 via leads 162. The final carry output 144 of adder 140 is applied to LE block 30, in which several of the LEs 50 have been configured to provide a ripple counter accumulator 150. The output of counter 150 is the more significant bits of the output of the MAC. Thus the full MAC output is both the output 164 of register 160 and the output 152 of counter 150. Register 160 provides the less significant bits of the full MAC output, and counter 152 provides the more significant bits of the full MAC output.

From the foregoing it will be apparent that during each cycle of its operation, circuitry 120, 130, and 140 forms the product of the current values of the multiplicand and the multiplier, and also adds to that product the value previously contained in the MAC (i.e., in output register 160). The result is a new accumulated value, which becomes the new value stored in register 160 and which may also increment the contents of counter 150. In this way, the circuitry provides both multiplier and accumulator operations; and because the addition required for the accumulation is combined with the addition of partial products, no separate addition or adder is required for the accumulation function.

Figure 4:
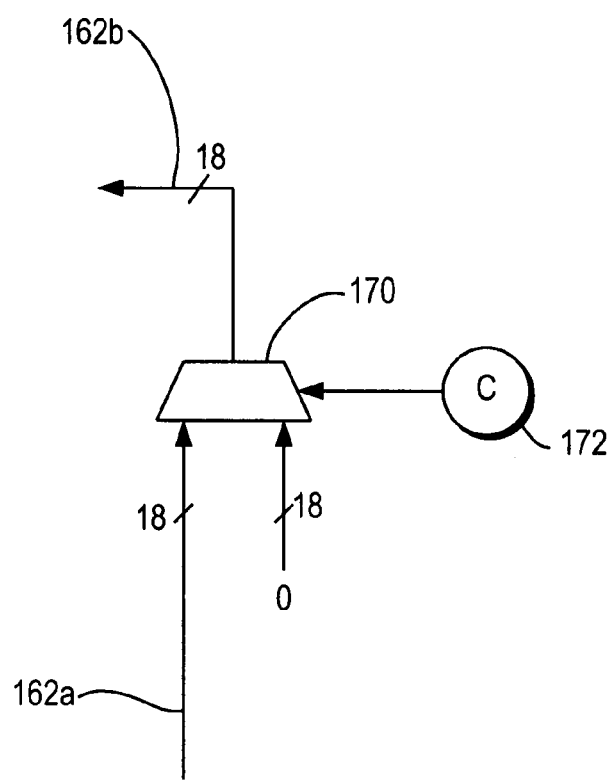
FIG. 4 is a simplified block diagram of an illustrative embodiment of a possible modification of a portion of FIG. 1 in accordance with the invention.

FIG. 4 shows that the accumulation function of the FIG. 1 can be made selectively operable if desired. In the illustrative embodiment shown in FIG. 4, multiplexer circuitry 170 is connected into bus 162 between register 160 and CSA tree 130. Multiplexer circuitry 170 is controllable (e.g., by programmable control element 172) to connect either bus segment 162a or constant 0-valued data to bus segment 162b. If accumulation is desired, then the former connection (162a to 162b) is made through multiplexer circuitry 170. If accumulation is not desired, then the latter connection (0 to 162b) is made through multiplexer circuitry 170. In the latter case, only multiplication is performed, with no accumulation of the successively computed multiplication products.

Recapitulating at least some aspects of the above, using the architecture of this invention, no extra carry-look-ahead adder ("CLA") is needed to perform the accumulation part of the MAC operation. The carry-save adder ("CSA") 130 and carry-propagate adder ("CPA") 140 are used instead of an additional CLA for the accumulator. Also, the multiplier output register 160 is used as the accumulator output register.

With this architecture the CSA sums the partial products of the multiplication with the accumulated result of the output register. Using the Booth algorithm, a 9×9 multiplication produces five partial products to the CSA. Then, instead of using one 3-1 CSA and one 2-1 CSA in parallel (Wallace Tree configuration), the architecture of this invention uses two 3-1 CSAs 132 in parallel. Because changing a 2-1 CSA to a 3-1 CSA adds only about four or five transistors, the die size increase is very small or effectively negligible. In addition, there is no speed penalty due to this modification because the critical path is still dominated by the 3-1 CSA path (both 3-1 CSA blocks 132 run in parallel).

The output of the CPA 140 is stored in the output register 160. Some applications may need the accumulator to include more bits than the multiplier output (18 bits in this example). This may be needed to allow accumulation of the multiplied output for a specified number of clock cycles. For a complex accumulator, extension of the CLA may be necessary. However, for most filter design, the basic accumulator addition function is sufficient. To maintain a low-cost accumulator design, the carry-out 144 from the CPA 140 is made available to the output. A simple ripple adder 150 is built (i.e., programmably configured) in the LE logic 30 to function as the extension of the accumulator if needed. Whenever the user needs a larger accumulator, the "soft" adder 150 can be built using LEs 50. If a particular application of FPGA 20 does not require accumulation or accumulation beyond the maximum word-length of one product of inputs 100a and 100b, adder 150 does not need to be implemented in (i.e., programmed into) LE block 30. The adder extension 150 can be a few bit adder or longer, depending on the user's requirements and design performance for a particular application. Using this approach, only one connection 144 exists between the CPA and the accumulator extension block in the LE logic 30. This reduces routing congestion and boosts system performance significantly. In addition, less LE resources are required to perform the accumulation. If the basic accumulation addition function (performed in DSP block 40) is sufficient, adder 150 can be omitted. At the same time, the maximum word-length of dedicated or special-purpose DSP block circuitry 40 can be no greater than the maximum word-length of one product of the multiplier and multiplicand inputs. It is not necessary to make DSP block circuitry 40 "wider" than this to accumulate overflow from adder 140 because that accumulation can be performed (in applications requiring it, and then only to the extent necessary) in soft IP that is programmed into LE block 30 as adder 150. (The maximum number of bits required for the product of an M-bit multiplier and an N-bit multiplicand is M+N bits.)

In sum, the present invention utilizes the multiplier circuitry to perform multiplication, addition, and overflow-accumulation without any speed impact. Also, it reduces the LE resources and routing track utilization, while easing the routing congestion to the device. To change the MAC mode back to multiplication mode, the soft IP overflow circuitry is omitted and the feedback path 162 from the output register 160 to the CSA block 130 is tied to zero through multiplexer or gating logic circuitry like 170 in FIG. 4.

Some of the advantages of the invention are set forth in the following. There is no speed impact in the multiplication mode. There is a significant performance improvement for MAC mode because no extra critical path through a CLA is required. The layout area increase is minimal. Interconnect routing between the multiplier and the accumulator is significantly reduced. This in turn reduces routing congestion in the FPGA routing, and it improves system performance. LE resource usage is reduced (e.g., because a second CLA adder is not required). The extended soft-accumulator block 150 can have various bit length.

Figure 5:
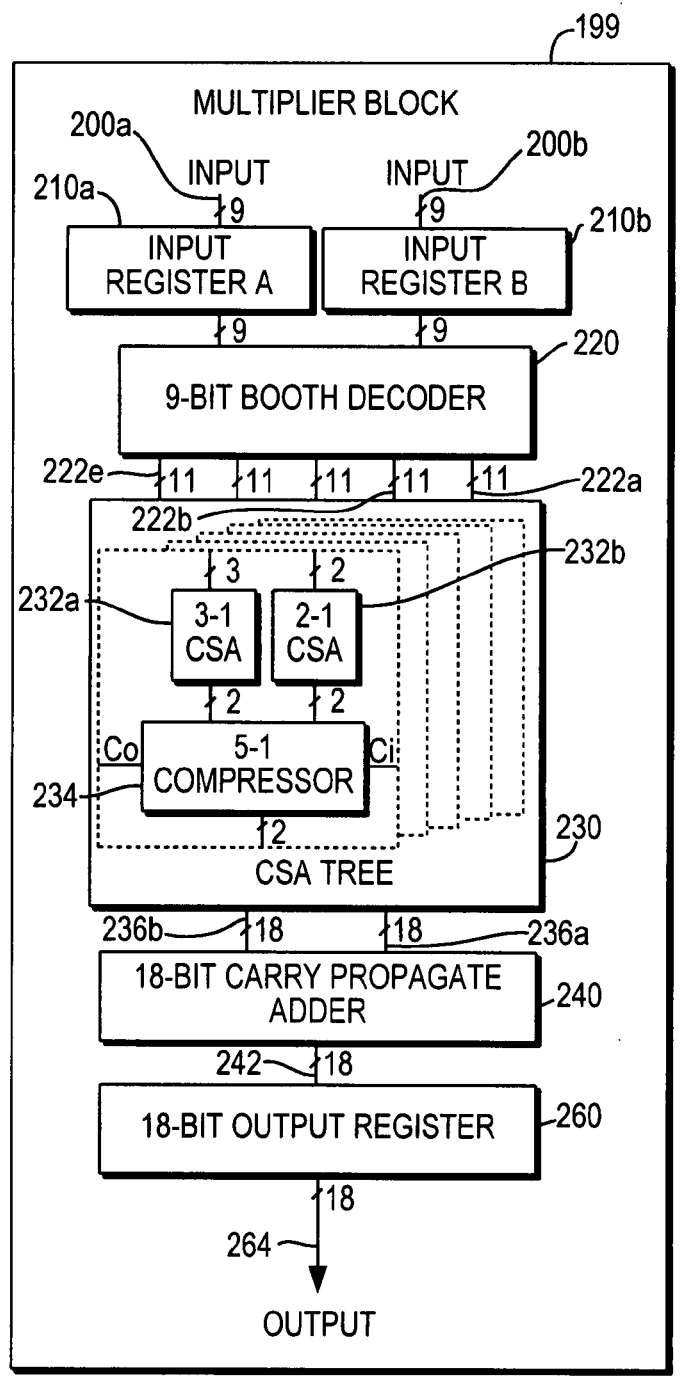
FIG. 5 is a simplified block diagram of known circuitry.

For purposes of comparison, FIG. 5 shows multiplier circuitry 199 that was commercially available prior to this invention. This circuitry is included in FPGA products available from Altera Corporation of San Jose, Calif. under the product names Cyclone I and Cyclone II. Similarities between the circuitry shown in FIG. 5 and the circuitry shown in the earlier FIGS. is indicated by the use in FIG. 5 of reference numbers that are increased by 100 from the reference numbers used for the generally similar elements in the earlier FIGS. Thus, for example, Booth decoder 220 in FIG. 5 can be the same as Booth decoder 120 in the earlier FIGS. As another example, CSA tree 230 in FIG. 5 can be generally similar to CSA tree 130 in the earlier FIGS. (except, of course, that CSA tree 230 does not receive any feedback from output register 260, and therefore can operate with 2-1 CSA block 232*b* rather than employing a 3-1 CSA block 132*b* as in the earlier FIGS.). The major differences between the FIG. 5 prior art and the present invention will be apparent from a comparison of FIG. 5 to the earlier FIGS. and from the earlier discussion. Circuitry 199 is only multiplier circuitry. It does not, by itself, have any accumulator capability.

It will be understood that the foregoing is only illustrative of the principles of the invention, and that various modifications can be made by those skilled in the art without departing from the scope and spirit of the invention. For example, the sizes of the various data words shown in the illustrative embodiment are only examples, and data words having other sizes can be used instead if desired. As another example, the gating between bus segments 162*a* and 162*b* (FIG. 4) can be different than the multiplexer circuitry shown in FIG. 4.

What is claimed is:

1. Multiplier-accumulator circuitry implemented in an integrated circuit device that includes a plurality of instances of general-purpose programmable logic elements and at least one instance of special-purpose circuitry, the multiplier-accumulator circuitry comprising:
   circuitry for forming a plurality of partial products of multiplier and multiplicand inputs;
   carry-save adder circuitry for adding together the partial products and another input to produce intermediate sum and carry outputs;
   final adder circuitry for adding together the intermediate sum and carry outputs to produce a final output having no more bits than the maximum number of bits required for one multiplier-multiplicand product; and
   feedback circuitry for applying the final output to the carry-save adder circuitry as said another input for accumulating the final output; and
   accumulator-overflow circuitry for accumulating overflow from the final adder circuitry beyond the maximum number of bits from the adding of the intermediate sum and carry outputs; wherein:
   said multiplier-accumulator circuitry, other than said accumulator-overflow circuitry, is implemented in the special-purpose circuitry; and
   said accumulator-overflow circuitry is implemented in the general-purpose logic elements.

2. The circuitry defined in claim 1 wherein the circuitry for forming comprises Booth decoder circuitry.

3. The circuitry defined in claim 1 wherein the final adder circuitry comprises carry-propagate adder circuitry.

4. The circuitry defined in claim 1 further comprising:
   first input register circuitry for storing the multiplier input; and
   second input register circuitry for storing the multiplicand input.

5. The circuitry defined in claim 1 further comprising:
   output register circuitry for storing the final output prior to use of that final output as said another input.

6. The circuitry defined in claim 1 wherein the feedback circuitry is selectively operable to apply the final output to the carry-save adder circuitry as said another input.

7. The circuitry defined in claim 1 wherein said integrated circuit device is a field-programmable logic array.

8. The circuitry defined in claim 1 wherein each of the multiplier and multiplicand inputs consists of nine bits.

9. The circuitry defined in claim 8 wherein the circuitry for forming comprises Booth decoder circuitry for forming five partial products.

10. The circuitry defined in claim 9 wherein the carry-save adder circuitry comprises:
    first and second banks of carry-save adders, the first bank adding three of the five partial products and a first portion of said another input, and the second bank adding two remaining ones of the five partial products and a second portion of said another input.

11. The circuitry defined in claim 10 wherein the carry-save adder circuitry further comprises:
    compressor circuitry for compressing two outputs of a carry-save adder in the first bank and two outputs of a carry-save adder in the second bank to produce two outputs of the carry-save adder circuitry.

12. A method of performing multiplier-accumulator operations comprising:
    forming a plurality of partial products of multiplier and multiplicand inputs using multiplication circuitry, said multiplication circuitry having a maximum number of bits;
    adding the partial products and another input using carry-save addition circuitry to produce intermediate sum and carry outputs;
    adding the intermediate sum and carry outputs using further addition circuitry, to produce a final output having no more bits than the maximum number of bits required for one multiplier-multiplicand product;
    registering the final output;
    feeding what has been registered back as said another input; and
    accumulating overflow beyond the maximum number of bits from the adding of the intermediate sum and carry outputs; wherein:
    said method, other than said accumulating, is implemented in special-purpose circuitry of a field-programmable logic array integrated circuit device; and
    said accumulating is implemented in general-purpose logic elements of the field-programmable logic array integrated circuit device.

13. The method defined in claim 12 wherein the forming comprises:
    inputting the multiplier and multiplicand inputs to Booth decoder circuitry.

14. The method defined in claim 12 wherein the adding of the intermediate sum and carry outputs is performed using carry-propagate addition circuitry.

15. A field-programmable gate array integrated circuit device comprising:
- a plurality of instances of general-purpose programmable logic elements; and
- special-purpose circuitry adapted to perform multiplier-accumulator operations and including:
  - (a) circuitry for forming a plurality of partial products of multiplier and multiplicand inputs;
  - (b) carry-save adder circuitry for adding together the partial products and another input to produce intermediate sum and carry outputs;
  - (c) final adder circuitry for adding together the intermediate sum and carry outputs to produce a final output having no more bits than the maximum number required for one multiplier-multiplicand product;
  - (d) output register circuitry for registering the final output; and
  - (e) feedback circuitry for selectively applying an output of the output register circuitry to the carry-save adder circuitry as said another input; the device further comprising accumulator-overflow circuitry, implemented in the logic elements, for accumulating overflow from the final adder circuitry.

16. The device defined in claim 15 wherein the special-purpose circuitry further includes:
- (f) input registers for the multiplier and multiplicand inputs.

* * * * *